Oct. 29, 1929.    J. D. RAUCH    1,733,753
POWER SHOVEL
Filed Sept. 3, 1926
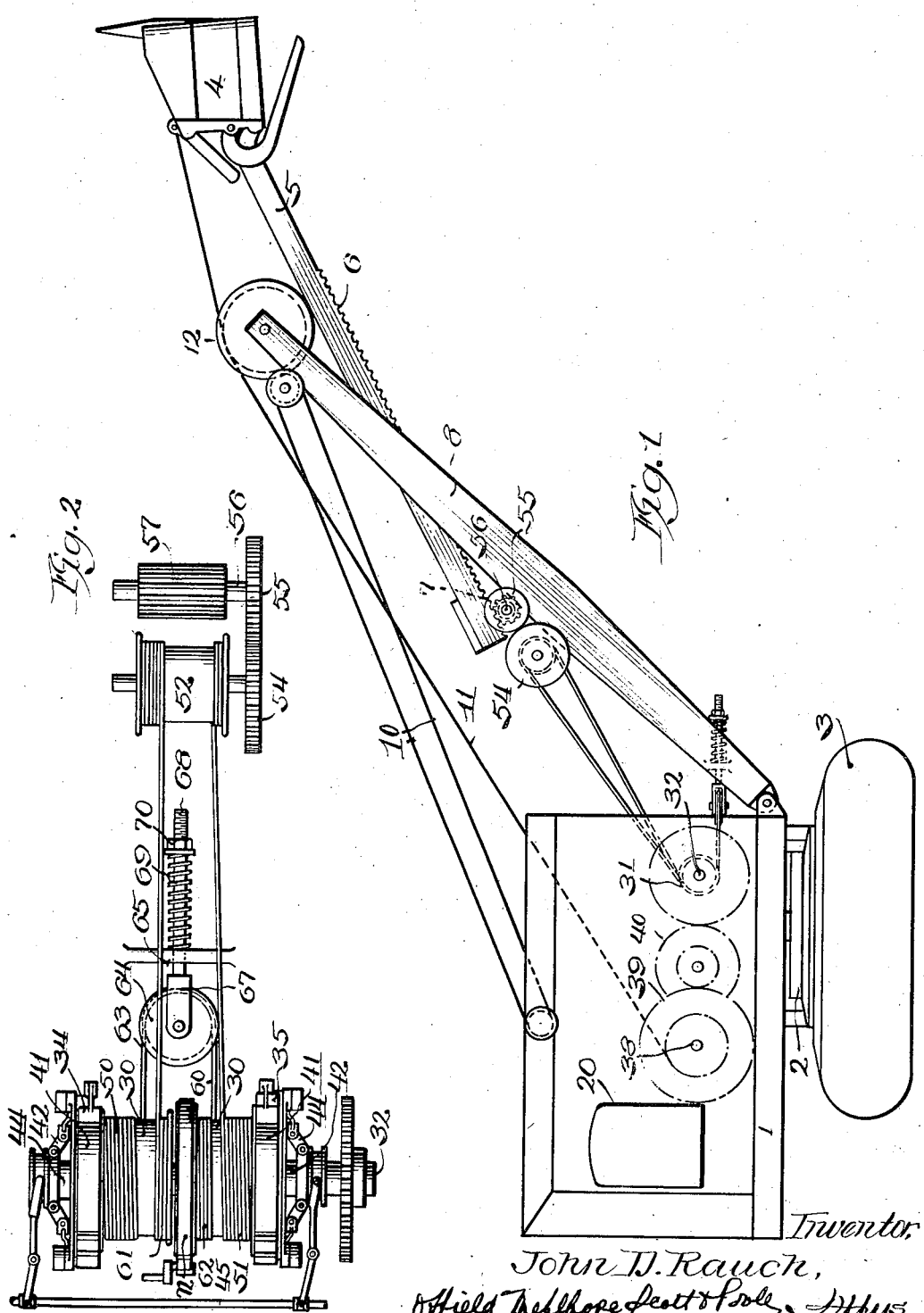
Inventor,
John D. Rauch,
Offield, Towle, Graff & Curtis, Attys Patented Oct. 29, 1929

1,733,753

UNITED STATES PATENT OFFICE

JOHN D. RAUCH, OF LIMA, OHIO, ASSIGNOR TO THE OHIO POWER SHOVEL COMPANY, OF LIMA, OHIO, A CORPORATION OF OHIO

POWER SHOVEL

Application filed September 3, 1926. Serial No. 133,341.

This invention relates to improvements in power shovels, and more particularly to power shovels of the dipper type, wherein the forward thrust or "crowding" of the dipper is effected through flexible cables or the like.

The principal object of the invention is to provide an improved arrangement of power drum and associated mechanism for actuating the control cables above referred to.

The invention may best be understood by reference to the accompanying drawings, in which Figure 1 is a side view of a power shovel constructed in accordance with my invention.

Figure 2 is an enlarged plan view, in part diagrammatic, showing details of the dipper actuating mechanism.

Referring now to details shown in the drawings, my invention is shown as applied to a power shovel having the motor and main operating mechanism carried on a frame 1, which frame is pivotally mounted on a base 2. The base is provided with endless tread devices 3, 3. The shovel 4 is of the dipper type, having a handle 5, provided with a rack 6 engaging a pinion 7 carried on boom 8, the latter being arranged at the front end of the main frame so as to be raised or lowered by cable 10, suitably controlled from the main frame. In the form shown, the dipper is further connected for operation by a single cable 11 passing over a sheave 12 on the upper end of the boom 8, and wound upon a main operating drum 13. The main drum 13 may be suitably connected for operation by the motor 20 in any desired manner, preferably being driven from a transversely disposed power shaft 38 disposed in front of said main drum and connected operatively to the motor 20 by any well known form of gearing (not shown).

Referring now more particularly to the means for controlling the crowding of the dipper through rack 6 and pinion 7, I provide a pair of drums 30 and 31 arranged side by side on transverse shaft 32 at the front end of the main frame adjacent the boom 8. These drums are each provided with clutch devices 34 and 35, respectively, affording selective driving engagement with the shaft 32, which is suitably driven, as for example, from power shaft 38, through gears 39 and 40. Clutches 34 and 35 may be of any form, as for instance, of the ordinary contracting type shown in Figure 2, including clutch bands 31, toggle links 42, 42 and a sleeve 43 controlled by yoke 44. The two clutches 34 and 35 preferably have interlocking connection through rod 45, so that only one of said clutches may be engaged at one time.

Flexible cables 50, 51 have their ends wound in the same directions around the drums 30 and 31, respectively, but extend to a cooperating drum 52 rotatably mounted on the boom so that the outer ends of the said cables are wound in opposite directions around the later drum, as clearly shown in Figure 1. Drum 52 is connected for actuating the pinion 7 through shaft 53, gears 54, 55 and pinion shaft 56.

In connection with the drums 30 and 31, I also provide an equalizing cable 60, having its opposite ends 61, 62 wound around each of said drums in directions opposite to the cables 50 and 51, and with an intermediate portion 63 trained over a sheave 64, which is suitably mounted adjacent said drums, as for instance, on bracket 65 carried by boom 8.

Yieldable mounting means is preferably provided for said sheave, in the form shown comprising a sheave yoke 67, a bolt 68 connected with said yoke and passing through bracket 65, and with a compression spring 69 interposed between said bracket and a nut 70 on the outer end of said bolt so as to maintain said equalizing cable under constant tension. Pressure on the spring 69 is adjustable by changing the position of nut 70, which adjustment is effective for taking up slack in cables 30 and 31, when required.

I also find it desirable to provide suitable braking means for drums 30 and 31. In the form shown, one drum 30 is provided with a brake 72 of the ordinary friction band type, which need not be described in detail, as its construction will be well understood by those skilled in the art. This brake is effective for holding the dipper handle at any desired point, as well as controlling its action when it is permitted to move in either direction under the influence of gravity.

The use and operation of the improved form of crowding mechanism above described, will now be understood. The shaft 32 is rotated by power in one direction only, viz, in a direction to wind in either cable 50 or 51, whenever its respective clutch is engaged. Thus, as seen in Figure 1, the shaft 32 rotates constantly in a counterclockwise direction. Now, when clutch 34 is engaged, cable 50 will be wound on drum 30 and withdrawn from drum 52 so as to actuate the pinion 7 in one direction, as for instance, in the arrangement shown in Figure 1, the rack 6 on the dipper handle being drawn rearwardly. The cable 51 would simultaneously be wound upon drum 52, but unwound from drum 31, the latter being allowed to rotate freely on shaft 32 for this purpose, in a direction opposite to its companion drum 30. The equalizing cable 60 is effective for insuring positive action of the two drums, and for taking up any slack in their respective cables.

When it is desired to reverse the action of the dipper handle to move it in the opposite direction, the clutch 34 is disengaged, and clutch 35 engaged to drive drum 31. The action of the parts in the reverse direction will be manifest.

The cable system is at all times under control of brake 72, either directly through cable drum 30 on which it is mounted, or indirectly through equalizing cables 60, when resistance is effected through cable 50.

The crowding mechanism above described has the advantages of being extremely simple in construction and operation, eliminating the requirement of more expensive reversing mechanism for the cable drums, and affording a most convenient take-up adjustment for slack, which is usually encountered due to the normal stretching of cables.

Although I have shown and described one particular embodiment of my invention, it will be understood that I do not wish to be limited to the exact construction herein illustrated and described, but that various changes and modifications may be made without departing from the spirit and scope of my invention as defined in the appended claims.

I claim as my invention:

1. In a power shovel, a frame having a boom mounted thereon, a dipper having a handle, means on said boom for moving said handle longitudinally relative to said boom, and means for actuating said last named means comprising a pair of drums mounted side by side on said frame, power connections for selectively rotating said drums, winding means mounted on said boom, operatively connected with said handle, a pair of cables connecting said winding means with said power drums, and arranged to drive said winding means in opposite directions when said drums are selectively driven, and guide means mounted in said boom disposed tangentially to both of said drums, and an independent equalizing cable operatively connecting said drums and engaging said guide means.

2. In a power shovel, a frame having a boom mounted thereon, a dipper having a handle, means on said boom for moving said handle longitudinally relative to said boom, and means for actuating said last named means comprising a pair of drums mounted on said frame, power connections for selectively rotating said drums, winding means mounted on said boom operatively connected with said handle, a pair of cables connecting said winding means with said power drums, and arranged to drive said winding means in opposite directions when said drums are selectively driven, an equalizing cable operatively connecting said drums, and tension means for said equalizing cable intermediate said drums.

3. In a power shovel, a frame having a boom mounted thereon, a dipper having a handle, means on said boom for moving said handle longitudinally relative to said boom, and means for actuating said last named means comprising a pair of drums mounted on said frame, power connections for selectively rotating said drums, winding means mounted on said boom operatively connected with said handle, a pair of cables connecting said winding means with said power drums, and arranged to drive said winding means in opposite directions when said drums are selectively driven, an independent equalizing cable operatively connecting said drums, spring tension means for said cable, and means for positively adjusting the spring tension means.

4. In a power shovel, a frame having a boom mounted thereon, a dipper having a handle, means on said boom for moving said handle longitudinally relative to said boom, and means for actuating said last named means comprising a pair of drums mounted concentrically on said frame, power means having selective connection with said drums for rotating them in the same direction, winding means mounted on said boom, a pair of cables connecting said winding means with said power drums, said cables being wound in opposite directions around said winding means, and in the same direction around said power drums, and independent driving connections between said power drums affording corresponding rotation of either drum in the opposite direction when the other drum is selectively driven.

5. In a power shovel, a frame having a boom mounted thereon, a dipper having a handle, means on said boom for moving said handle longitudinally relative to said boom, and means for actuating said last named means comprising a pair of drums mounted concentrically on said frame, power means having selective connection with said drums for rotating them in the same direction, winding means mounted on said boom, a pair of cables connecting said winding means with said power drums, said cables being wound in opposite directions around said winding means, and in the same direction around said power drums, and independent driving connections between said power drums affording corresponding rotation of either drum in the opposite direction when the other drum is selectively driven, and a brake connected with one of said power drums.

Signed at Lima, Ohio, this 30th day of August, 1926.

JOHN D. RAUCH.